March 14, 1950 R. W. JONES 2,500,286

IMPULSE CORRECTING REPEATER

Filed Aug. 30, 1946 2 Sheets-Sheet 1

INVENTOR.
ROY W. JONES

BY [signature]

ATTORNEY

*INVENTOR.*
ROY W. JONES
*BY* Chas. Ke. Candy
ATTORNEY

UNITED STATES PATENT OFFICE 2,500,286

IMPULSE CORRECTING REPEATER

Roy W. Jones, Chicago, Ill., assignor to Automatic Electric Laboratories, Inc., Chicago, Ill., a corporation of Delaware Application August 30, 1946, Serial No. 694,045

5 Claims. (Cl. 179—16)

Figure 1:
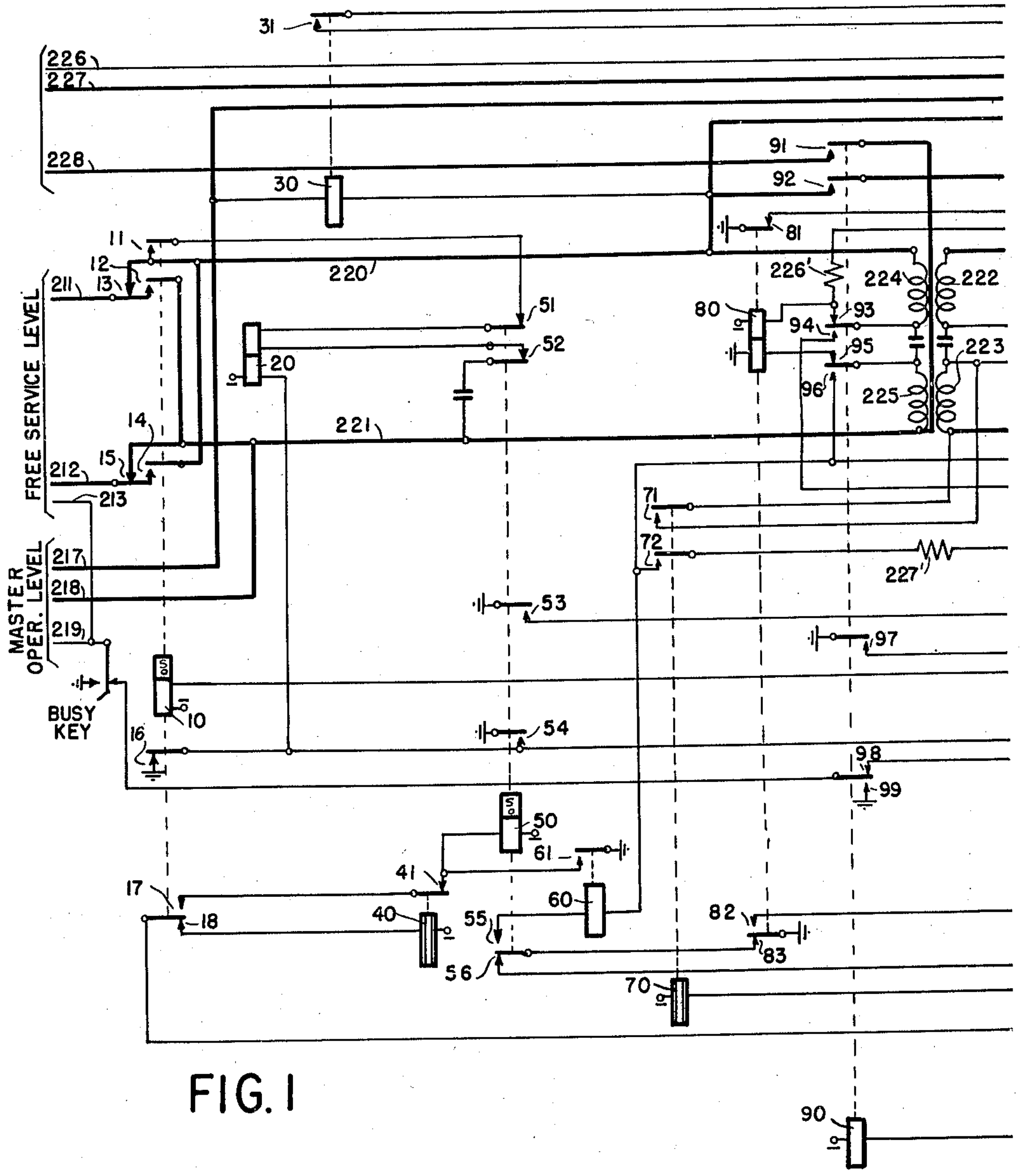

The invention relates in general to automatic telephone systems, and more particularly to a novel circuit arrangement for a two-way repeater circuit.

The main object of the invention is to provide a two-way repeater circuit arrangement whereby impulse transmission may be accurately and efficiently accomplished in both directions.

The two-way repeater is arranged to correct impulses being transmitted in one direction. The impulse correcting circuit is of the type which repeats a corrected impulse only after the corresponding incoming impulse has been terminated. The open interval of the corrected impulses being independent of the duration of the incoming impulses. The present invention is in the nature of an improvement on the impulse correcting repeater circuits disclosed in the Lomax-Jones application, Serial Number 666,283, filed May 1, 1946, now Patent Number 2,487,252 granted November 8, 1949, and in the Kessler application, Serial Number 694,043, filed August 30, 1946.

A feature of this invention is the manner in which a relay in the repeater is arranged to operate on the first break of the incoming impulses and on each subsequent break, the same relay effective with a second relay to determine the duration of the break period of a corresponding impulse to be transmitted over the outgoing connections of the repeater on cessation of the incoming impulse.

Another feature is the manner in which the repeater line relay is arranged with its back contacts connected in the operating circuits of the two relays whose operating times are effective to determine the length of the break period of the outgoing impulses.

Still another feature is the manner in which a holding relay is connected in the circuit to provide means for holding a control relay which is normally energized during the break period of the incoming impulses until such time as a second relay initiates a corresponding outgoing pulse independent of the direction of the incoming impulse break period and whereby the same holding relay provides a circuit for holding the second relay which is energized during each make period of the incoming impulses for a definite period of time and independent of the duration of the incoming impulse make period.

A further feature of this invention is the provision of a pair of incoming levels for seizing the repeater from one direction and a single incoming level for seizing the repeater from the other direction, the repeater being arranged to automatically transmit an impulse over said single level end of the repeater to perform a trunking operation when seized over one of said pair of levels to provide reverse battery supervision if seized over the other of said pair of levels, and on receipt of impulses over either of said levels to transmit a corrected impulse over said single level end of the repeater only on termination of each corresponding incoming impulse. The advantage of the impulse transmitted automatically is evident where the circuit is to be used in an automatic sub-office where it is necessary to reach the toll operator over trunks to a tandem automatic office by dialing a single digit. The stop dialing feature makes this repeater most desirable for use in an inter-toll dialing network.

A further feature of this invention is the provision of stop dialing supervision in this type repeater to allow associated automatic switching sufficient operating time when the repeater is seized over a certain level.

The invention both as to its organization and method of operation, together with further objects and advantages thereof, will best be understood by reference to the following specification and the accompanying drawings.

Figure 2:
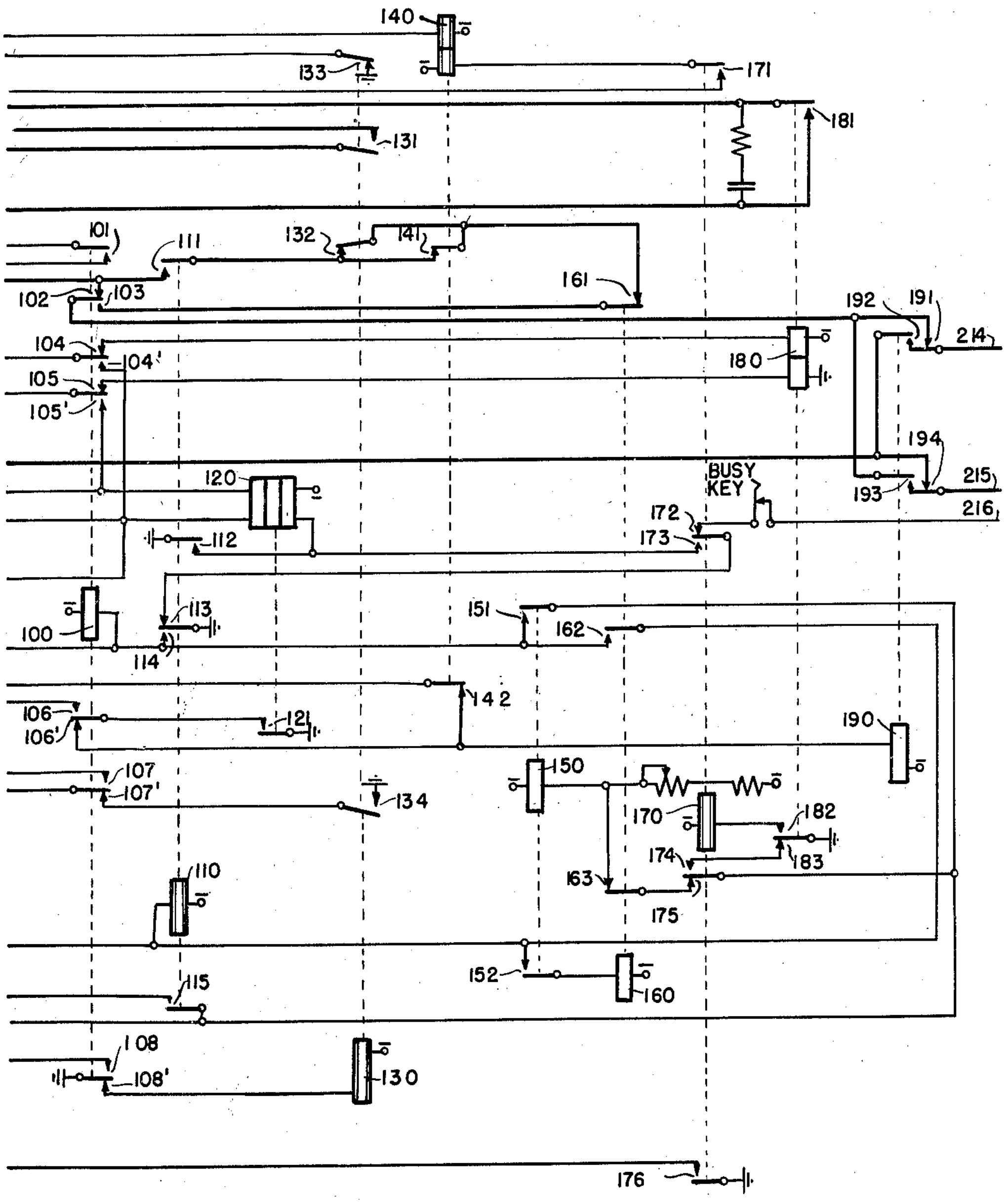

The accompanying drawings, Figures 1 and 2, when properly arranged in a side by side manner illustrate a two-way repeater circuit having the invention embodied therein. The repeater includes the master office level having conductors 217, 218, 219 and the free service level having conductors 211, 212, 213 all accessible to a local subscriber placing a call to a distant exchange. A relay set in the repeater is actuated when a call is received over the master office level to send an impulse ahead over conductors 214 and 215 for the purpose of automatically connecting the subscriber to a toll trunk in the office connected to the outgoing side of the repeater. A relay set in the repeater is operated at times to notify the operator that the call is of a toll nature. The repeater is arranged to repeat impulses in both directions, and to correct impulses repeated in one direction. A talking circuit is completed through the repeater in either direction on cessation of the incoming impulses by an operation of the called party. In the event that a call is received from a distant exchange over conductors 214 and 215 the repeater is arranged to send a stop dial signal back over the lines connected thereto until such time as the repeater causes an associated line circuit to have a finder complete the connection. Reverse battery supervision is provided on calls incoming over the free service level.

Although numerous repeater circuit arrangements are possible, for purposes of explanation it will be assumed that a local subscriber has access to the master office and free service level over a finder and a connector connected therebetween and that the single level side of the repeater is connected to a repeater of similar nature located at a distant exchange. Calls received over the single level side of the repeater from the distant repeater are extended over conductors 226, 227 and 228 to a line circuit and a finder connected thereto. The line circuit is of the well known type which extends ground over the test lead to the repeater when the finder locates the trunk.

In view of the above brief description of the invention and certain of its more permanent features, the operations involved in setting up connections in a system embodying the same will now be described in detail. A connection to the repeater over the free service level will be considered first. As an incoming call reaches the repeater over conductors 211, 212, 213 a loop circuit is completed from the seizing switch over conductors 211 and 212, contacts 13 and 15, conductors 220 and 221, repeater coil windings 224 and 225, contacts 93 and 95 to relay 80. Relay 80 operates and at its contacts 81 controls a point in a self pre-energizing circuit, at its contacts 82 completes a circuit to relay 110, and at its contacts 83 opens a point in the circuit for relays 150 and 70. Relay 110 operates and at its contacts 111 closes a point in the outgoing loop pulsing circuit, at its contacts 112 completes a circuit to the polarizing winding of electro-polarized shunt field relay 120, at its contacts 113 removes ground from the all trunk busy registering conductor 216, at its contacts 114 completes a circuit to relay 100, and at its contacts 115 further prepares the circuit to relays 70 and 150.

Relay 100 operates and at its contacts 101 closes a point in the pre-energizing circuit for relay 80, at its contacts 103, 104′, 105′ completes an outgoing loop circuit over conductors 214 and 215, the circuit in the repeater to the conductors now extending from conductor 214 over contacts 191, 103, 161, 141, 111, repeater coil winding 222, contacts 104′, the operating winding of polarized relay 120, contact 105′, repeater coil winding 223, and contacts 194 to conductor 215. The windings of relay 120 are differentially energized and this relay is indifferent to operate. Relay 100 at its contacts 106 prepares a circuit for reverse battery relay 10, at its contacts 106′ opens a point in the circuit to relay 190, at its contacts 107 connects ground to conductor 213 over contacts 16, 107 and 98 to busy the repeater to the connectors, at its contacts 108 completes a circuit to relay 40 over contacts 18, and at its contacts 108′ opens the normally energized relay 130. Relay 40 operates and at its contacts 41 opens a point in one of the operating circuits to relay 50. Relay 130 releases and at its contacts effects connections having no function at this time.

Assuming now receipt of a series of impulses over conductors 211 and 212. For the first break of the impulses received, relay 80 releases and at its contacts 81 inserts resistance 226 in series with relay 80 for pre-energizing purposes, at its contacts 82 opens the circuit to relay 110, which is slow to release and will hold for the series of impulses, and at its contacts 83 completes a circuit to relay 70 over contacts 56 and 115 and a circuit to relay 150 over contacts 56, 115, 175 and 163. Relay 70 operates and at its contacts 71 removes one winding 223 of the repeater coil from the loop circuit and at its contacts 72 inserts the non-inductive resistance 227 in the pulsing circuit in shunt of relay 120. Relay 150 operates and at its contacts 151 completes a self-holding circuit over contacts 114, 151, 175 and 163, at its contacts 152 prepares a circuit to relay 160.

On the first make after the first break relay 80 is energized, and at its contacts 81 disconnects the resistance 226 formerly in series with relay 80 so that the relay will release more quickly, at its contacts 82 completes a circuit to relays 160 and 110, and at its contacts 83 opens the operating circuits to relays 70 and 150. Relay 160 operates and at its contacts 161 opens the outgoing repeater circuit thereby effecting the break period of the first repeated impulse over conductors 214 and 215, and at its contacts 162 completes a self-holding circuit over contacts 114, 162, and 152, and at its contacts 163 opens the holding circuit to relay 150. Relay 70 being slow to release, holds for the series of impulses. Relay 150 now releases and at its contacts 151 opens a further point in its self-holding circuit, and at its contacts 152 opens the holding and operating circuits to relay 160. Relay 160 releases and at its contacts 161 closes the loop impulse repeating circuit, and at its contacts 162 opens a further point in the self-holding circuit, and at its contacts 163 prepares an operating circuit for relay 150. Thus it will be noted, that the length of the repeated pulse over outgoing conductors 214 and 215 is determined by the release times of relays 150 and 160. The outgoing impulses are of a definite length independent of the duration of the incoming impulses. The first outgoing break period is effected during the make period following the break period of the first incoming pulse. The repeater circuit repeats each incoming impulse as outlined above. After the cessation of incoming impulses, relays 40, 80, 100 and 110 remain energized. When the called party answers, reverse battery is applied over incoming conductors 214 and 215 from the subsequent repeater and relay 120 is now operated as both windings are energized in the same direction. Relay 120 at its contacts 121 completes a circuit to relay 10 over contacts 106 and 121. Relay 10 operates and at its contacts 11 bridges relay 20 across conductors 211 and 212, at its contacts 12, 13, 14 and 15 reverses battery over the conductors 211 and 212, at its contacts 16 removes the ground short circuit for relay 20, at its contacts 17 prepares an operating circuit to relay 50 over contacts 108 and at its contacts 18 opens the operating circuit to relay 40. Relay 20 does not perform a function at this time. Relay 40 after a brief interval releases, and at its contacts 41 closes the operating circuit to relay 50. Relay 50 operates and at its contacts 51 and 52 opens the circuit which bridges relay 20 across conductors 220 and 221, at its contacts 53 completes a second holding circuit to relay 100, at its contacts 54 short circuits relay 20 to ground, and at its contacts 55 prepares an operating circuit for relay 60. A talking circuit is now extended through the repeater.

If the called party releases first, the operating winding of relay 120 deenergizes. Relay 120 releases and at its contacts 121 opens the operating circuit to relay 10. Relay 10 deenergizes and at its contacts 12, 13, 14, and 15 restores a normal battery connection over conductors 211 and 212, at its contacts 16 applies a second short circuit to relay 20, at its contacts 17 opens the operating circuit to relay 50, and at its contacts 18 completes an operating circuit to relay 40. Relay 50 releases and at its contacts 51 and 52 bridges relay 20 across conductor 220 and 221, at its contacts 53 opens the secondary holding circuit to relay 100, at its contacts 54 removes secondary ground to the lower winding of relay 20, at its contacts 55 opens a further point in the operating circuit for relay 60, and at its contacts 56 closes a point in the operating circuits for relays 70 and 150. When the calling party hangs up, relay 80 will release and at its contacts 82 open the operating circuit to relay 110, and at its contacts 83 close a circuit to relays 70 and 150. Relays 70 and 150 energize but perform no function. Relay 110 after an interval releases and at its contacts opens the operating circuits to relays 70, 100 and 150. Relay 100 releases and at its contacts 108′ closes the operating circuit to relay 130. Relay 130 operates, and removes ground from conductor 219. The set is now in its normal released condition.

If the calling party hangs up first, relay 80 releases and at its contacts 82 opens the operating circuit to relay 110, and at its contacts 83 completes a circuit for relay 60 over contacts 83, 55, 105′, repeating coil winding 223, contacts 194 and conductor 215. Battery is reversed on conductors 214 and 215 at this time. Relay 60 operates and at its contacts 61 completes a holding circuit for relay 50. After an interval, relay 110 releases, and at its contacts 112 opens the polarizing winding of relay 120 and at its contacts 114 opens the operating circuit to relay 100. Relay 100 holds over contacts 53. Relay 120 releases and at its contacts 121 opens the circuit to relay 10. Relay 10 releases and at its contacts 17 opens the circuit to relay 50 and at its contacts 18 closes a circuit to relay 40. Relay 40 energizes and at its contacts 41 opens a further point in the circuit to relay 50. Relay 50 hold over contacts 61. When the called party now hangs up, battery is restored to normal over conductors 214 and 215. Relay 60 thereupon releases and at its contacts 61 opens the circuit to relay 50. Relay 50 releases and at its contacts 53 opens the holding circuit to relay 100. Relay 100 releases and at its contacts 108 opens the operating circuit to relay 40 and at its contacts 108′ completes a circuit to relay 130. After an interval relay 40 releases. Relay 130 energizes and the repeater is now restored to its normal position.

Now, assume a call is extended to the repeater over the master office level which comprises conductors 217 and 218. A loop is completed through relay 30 in series with relay 80 over contacts 93, coil 224, conductor 220, relay 30, conductor 217, the line circuit connected thereto, conductors 218 and 221, coil 225, contact 95 and the lower winding of relay 80. Relay 80 operates and at its contact 81 opens a point in its preenergizing circuit, at contacts 82 completes a circuit to relay 110. Relay 30 operates at the same time and at its contacts 31 completes a circuit to relay 140 over contacts 133. Relay 140 operates and at its contacts 141 opens a point in the outgoing loop circuit. Relay 110 operates and at its contacts 111 closes another point in the outgoing loop circuit, and at its contacts 114 completes a circuit to relay 100. Relay 100 operates and closes the loop circuit described heretofore at its contacts 103, 104′, and 105′, and at its contacts 108′ opens the operating circuit to normally energized relay 130. The other contacts on relay 100 are ineffective to perform a function at this time. Relay 130 releases and at its contacts 131 short circuits relay 30, at its contacts 132 opens the loop circuit, the multiple portion of the loop circuit having been previously opened by energized relay 140 at its contacts 141, and relay 130 at its contacts 133 opens the operating circuit to relay 140. Relay 140 releases after an interval and recloses the loop circuit at its contacts 141. It will be noted, therefore, that the repeater, when seized over the master office level, automatically sends an impulse ahead, the break interval of the impulse being determined by the release time of relay 140. By connecting the first level of the seized incoming selector at a distant exchange to the toll operator position, the repeater is effective to connect a subscriber to the operator by merely seizing the repeater set.

In the event that the call reaching the repeater over the master office level is from a paystation, the paystation tone will reach the repeater over conductor 219 and travel over contacts 98, 107, and 16 to ground. When the operator answers, relay 120 energizes and at its contacts 121 completes a circuit to relay 10 over contacts 106. Relay 10 operates to complete the talking connection at its contacts 12, 13, 14 and 15 as previously described, at its contacts 11 bridges relay 20 across conductors 220 and 221, at its contacts 16 removes ground from conductor 219, at its contacts 17 prepares an operating circuit for relay 50, and at its contacts 18 opens the operating circuit to relay 40. The paystation tone now flows through the lower winding of relay 20 and induces a tone in the upper winding of same. This induced tone is placed across conductors 220 and 221 and transmitted through the repeater to the operators. Relay 40 releases and completes the operating circuit to relay 50. Relay 50 operates and at its contacts 54 regrounds conductor 219 and short circuits the lower winding of relay 20 thereby terminating transmission of the paystation signal to the operator, and at its contacts 51 and 52 removes the relay bridge from the line.

Now assuming an incoming call reaches the repeater over connections 214 and 215, a circuit is completed through the upper winding of relay 180, contacts 104, coil 222, contacts 102, 191, conductor 214, the circuit connected between same and conductor 215, contacts 194, coil 223, contacts 105 and the lower winding of relay 180. Relay 180 operates and at its contacts 181 closes a point to prepare a loop pulsing circuit over conductors 227 and 228, at its contacts 182 completes a circuit to relay 170, at its contacts 183 performs no function at this time. Relay 170 operates and at its contacts 171 prepares a circuit to relay 140 over conductor 226, at its contacts 172 removes ground from the "all trunks busy" connection, at its contacts 173 completes a circuit to the first winding of polarized relay 120, at its contacts 174 prepares a circuit for relay 70, at its contacts 175 opens a point in the circuit to relay 150, and at its contacts 176 completes a circuit to relay 90. Relay 90 energizes and at its contacts 91 and 92 further prepares the outgoing loop pulsing circuit which passes over conductor 227 and 228, at its contacts 93 and 95 removes relay 80 from the pulsing circuit, at its contacts 94 and 96 completes the pulsing circuit and inserts the operating winding of relay 120 in series with the pulsing circuit, at its contacts 97 completes a circuit to relay 190 over contacts 142, and at its contacts 99 connects ground to conductor 219 to busy the repeater to local connectors. Relay 190 operates and at its contacts 191, 192, 193 and 194 reverses battery over conductors 214 and 215 thereby sending a stop dial signal back to the originator of the call. The outgoing pulsing loop completed by the line circuit connected to conductors 227 and 228 extends over contacts 191, 92, conductors 226, coil 224, contacts 96, the operating winding of relay 120, contacts 98, winding 225, contacts 91 and conductor 228. The completed connection to the line circuit causes the finder to hunt for the trunk which is connected to repeater conductors 227 and 228. When the trunk is found, ground is connected by the finder through the line circuit to conductor 228 which completes a circuit to relay 140 over contacts 171. Relay 140 operates and at its contacts 142 opens the operating circuit to relay 190. Relay 190 releases and at its contacts 191, 192, 193, 194 restores normal battery connection to conductors 214 and 215 thereby removing the stop-dial signal over same. Impulses received over the conductors 214 and 215 effect operation of relay 180 over contacts 102, 104 and 106. On receipt of the first break period relay 180 releases and at its contacts 181 opens the outgoing loop thereby transmitting a corresponding break period over conductors 227 and 228, at its contacts 182 opens the operating circuit to relay 170, and at its contacts 183 completes a circuit over contacts 174 to relay 70. Relay 170 is slow to release and holds up for the duration of impulses. Relay 70 operates and at its contacts 71 removes winding 223 from the pulsing circuit, and at its contacts 72 performs a function which is not effective at this time.

The impulses are repeated as described. On cessation of the incoming impulses relays 180, 170, 90, 140 and 70 remain in the energized condition. After a brief interval relay 70 releases. When the called party answers, the operating winding of relay 120 is energized, thereby causing the polarized relay 120 to energize. Relay 120 at its contacts 121 completes a circuit over 106' to relay 190. Relay 190 energizes and at its contacts 191, 192, 193 and 194 reverses battery to establish a talking circuit through the repeater. Release of the repeater is effected by restoration of the receiver of either subscriber. If the calling party restores the receiver first, relays 120 and 180 release and at their contacts effect the release of relays 170, 90, 140 and 190. If the caled party hangs up first, relay 120 releases and at its contacts 121 opens the circuit to relay 190. Relay 190 releases and restores normal battery to the line. Relays 170, 90 and 140 are released when the calling subscriber hangs up and effect release of relay 80. The set is now in its normal released condition.

While particular embodiments of the invention have been illustrated, it is to be understood that numerous modifications in the details of arrangement may be resorted to without departing from the true spirit and scope of the invention as defined in the appended claims.

What is claimed is:

1. In an impulse correcting repeater arranged to receive impulses, each of said impulses having a make and a break period, the ratio of said periods being different at different times, a control relay having an operating circuit, means responsive to said incoming impulses to alternately open and close said operating circuit, and thereby operate said control relay, a second relay having an operating circuit controlled by operation of said means to cause said second relay to transmit a corrected impulse only on termination of the corresponding incoming impulse, a holding relay operated responsive to the initial operation of said means to maintain said control relay energized after said means has opened said control relay operating circuit until said second relay has initiated the break period of a corrected impulse, said holding relay operated to maintain said second relay energized for a definite period of time independent of the operation of said means, the duration of the break period of said corrected impulses being determined by the operating times of said control and said second relay independent of the make to break ratios of said incoming impulses.

2. A two-way repeater arranged to receive impulses over a single level from one direction and a pair of levels from the other direction, means for seizing said repeater over any one of said levels, means in said repeater operated on receipt of an impulse over either one of said pair of levels to transmit a corrected impulse over said single level side of said repeater only upon cessation of the corresponding incoming impulse, means operated when said repeater is seized over one of said pair of levels to automatically transmit an impulse over said single level side of said repeater for trunking purposes, means for providing reverse battery supervision whenever said repeater is seized over the other of said pair of levels, means operated to transmit a stop dial signal over said single level whenever said repeater is seized over said single level, and means operated responsive to receipt of a supervisory signal to complete a talking circuit through said repeater.

3. A repeater having incoming and outgoing connections, a normally energized relay, a line relay, a third relay connected in series with said line relay, means for seizing said repeater over said incoming connections, means operated responsive to seizure of said repeater to operate said normally energized relay to automatically transmit an impulse over said outgoing connection, and a second means operated responsive to operation of said series relay to determine the duration of said impulse.

4. A repeater as claimed in claim 3 in which said outgoing connection includes a normally closed multiple circuit controlled by said normally energized relay and said second means, one portion of said multiple circuit opened on operation of said second means, the other portion of said circuit opened on operation of said normally energized relay, said second means operated responsive to operation of said normally energized relay to reclose the outgoing circuit and thereby terminate the open period of the impulse.

5. In an impulse correcting repeater arranged to receive incoming impulses, each of said impulses having a make and a break period, the ratio of said periods being different at different times, a line relay energized during each make period and deenergized during each break period of said incoming impulses, a control relay, a pulsing relay, an operating circuit including back contacts on said line relay completed for operating said control relay each time said line relay is deenergized during a break period, a locking circuit for said control relay including contacts on said control relay completed by the operation of said control relay, an energizing circuit for operating said pulsing relay, normally open control contacts on said control relay closed by the operation of said control relay to prepare said energizing circuit of said pulsing relay, make contacts on said line relay and said control contacts on said control relay completing said energizing circuit to energize said pulsing relay each time said line relay is energized during a make period following a break period, a locking circuit for said pulsing relay including contacts on said pulsing relay completed by the operation of said pulsing relay, normally closed contacts on said pulsing relay included in both said operating and locking circuits of said control relay opened by the operation of said pulsing relay to deenergize said control relay, said normally open control contacts on said control relay also included in said locking circuit of said pulsing relay to cause the deenergization of said pulsing relays in response to the deenergization of said control relay, and pulsing contacts on said pulsing relay operated by the energizations and deenergizations of said pulsing relay for transmitting corrected outgoing impulses having break periods determined only by the operating time of both said control and pulsing relays.

ROY W. JONES.

REFERENCES CITED

The following references are of record in the file of this patent:

UNITED STATES PATENTS

| Number | Name | Date |
|---|---|---|
| 1,747,405 | Beckerath | Feb. 18, 1930 |
| 1,831,730 | Ahlberg | Nov. 10, 1931 |
| 2,061,802 | Kroll et al. | Nov. 24, 1936 |